(12) United States Patent
Harlan

(10) Patent No.: US 10,023,248 B1
(45) Date of Patent: Jul. 17, 2018

(54) SLIDING TAILGATE

(71) Applicant: Robert Michael Harlan, Shepherdsville, KY (US)

(72) Inventor: Robert Michael Harlan, Shepherdsville, KY (US)

( * ) Notice: Subject to any disclaimer, the term of this patent is extended or adjusted under 35 U.S.C. 154(b) by 0 days.

(21) Appl. No.: 15/622,125

(22) Filed: Jun. 14, 2017

(51) Int. Cl.
 *B62D 33/027* (2006.01)
 *B60P 1/26* (2006.01)
 *B62D 33/023* (2006.01)

(52) U.S. Cl.
 CPC ............ *B62D 33/0273* (2013.01); *B60P 1/26* (2013.01); *B62D 33/023* (2013.01)

(58) Field of Classification Search
 CPC .......................... B62D 33/0273; B62D 33/03
 USPC ....................................... 296/57.1
 See application file for complete search history.

(56) References Cited

U.S. PATENT DOCUMENTS

| | | | |
|---|---|---|---|
| 4,580,828 A | 4/1986 | Jones | |
| 5,123,692 A | 6/1992 | Couvillion | |
| 5,232,260 A | 8/1993 | Lippard | |
| D397,978 S | 9/1998 | Helgeson et al. | |
| 6,276,738 B1 | 8/2001 | Marshall | |
| 7,128,357 B1 * | 10/2006 | Carroll | B60P 1/26 296/61 |
| 7,607,711 B2 * | 10/2009 | Marshall | B62D 33/0273 296/51 |
| 8,342,590 B1 * | 1/2013 | Richburg | B60P 1/26 296/50 |
| 8,740,279 B1 | 6/2014 | McGoff | |
| 2002/0074817 A1 | 6/2002 | Bailey | |
| 2007/0252402 A1 * | 11/2007 | Marshall | B62D 33/0273 296/57.1 |
| 2010/0109368 A1 * | 5/2010 | Marshall | B62D 33/0273 296/57.1 |

FOREIGN PATENT DOCUMENTS

WO          03000519 A1      1/2003

* cited by examiner

*Primary Examiner* — Jason S Morrow
(74) *Attorney, Agent, or Firm* — Kyle A. Fletcher, Esq.

(57) ABSTRACT

The sliding tailgate is adapted for use with an automobile. The automobile is further defined with a working space. The working space is an interior space within which the load carried by the automobile is stored. The sliding tailgate is an apparatus upon which the tailgate of the automobile is attached such that: 1) the tailgate can be opened and closed to provide access into the working space of the automobile; and, 2) the tailgate can be retracted to a location underneath the working space to provide less restricted access to the working space of the automobile. The sliding tailgate comprises a storage slot, a mounting structure, a track system, and a locking system. The track system is contained within the storage slot. The mounting structure attaches the tailgate to the track system. The locking system locks the tailgate in the extended position.

18 Claims, 8 Drawing Sheets

SLIDING TAILGATE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of land vehicles for travel including superstructures for load carrying motor vehicles, more specifically, a moveable tailboard further comprising stationary sideboards.

SUMMARY OF INVENTION

The sliding tailgate is adapted for use with an automobile. The automobile is further defined with a working space. The working space is an interior space within which the load carried by the automobile is stored. The sliding tailgate is an apparatus upon which the tailgate of the automobile is attached such that: 1) the tailgate can be opened and closed to provide access into the working space of the automobile; and, 2) the tailgate can be retracted to a location underneath the working space to provide less restricted access to the working space of the automobile.

These together with additional objects, features and advantages of the sliding tailgate will be readily apparent to those of ordinary skill in the art upon reading the following detailed description of the presently preferred, but nonetheless illustrative, embodiments when taken in conjunction with the accompanying drawings.

In this respect, before explaining the current embodiments of the sliding tailgate in detail, it is to be understood that the sliding tailgate is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sliding tailgate.

It is therefore important that the claims be regarded as including such equivalent construction insofar as they do not depart from the spirit and scope of the sliding tailgate. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
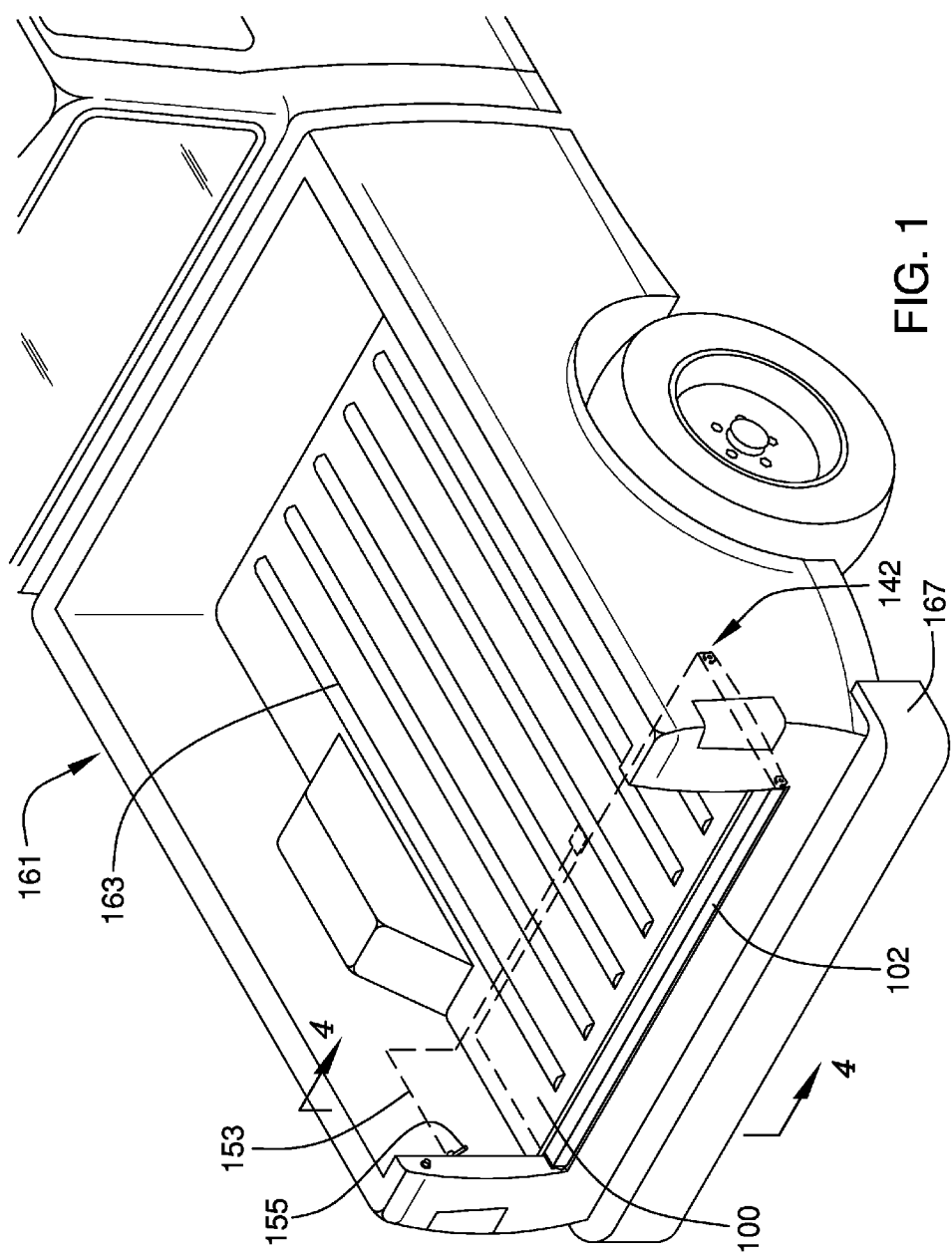
FIG. 1 is a perspective extended view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 8.

The sliding tailgate 100 (hereinafter invention) comprises a storage slot 101, a mounting structure 102, a track system 103, and a locking system 104. The track system 103 is contained within the storage slot 101. The mounting structure 102 attaches the tailgate 162 to the track system 103. The locking system 104 locks the invention 100 in position when the invention 100 is in the extended position 165. The invention 100 is adapted for use with an automobile 161. The automobile 161 is further defined with a working space 163. The working space 163 is an interior space within which a load carried by the automobile 161 is stored. The invention 100 is an apparatus upon which the tailgate 162 of the automobile 161 is attached such that: 1) the tailgate 162 can be opened and closed to provide access into the working space 163 of the automobile 161; and, 2) the tailgate 162 can be retracted to a storage slot 101 located underneath the working space 163 in a manner that provides a less restricted access to the working space 163 of the automobile 161.

Within this disclosure, the tailgate 162 is said to be in an extended position 165 when the tailgate 162 is in a position to open and close normally. When the tailgate 162 is stored within the storage slot 101, the tailgate 162 is said to be in a retracted position 166. The verb to retract will be used to describe the transition from the extended position 165 to the retracted position 166 the tailgate 162. The verb to extend will be used to describe the transition from the retracted position 166 to the extended position 165.

The storage slot 101 is a compartment into which the tailgate 162 retracts into the retracted position 166. The storage slot 101 comprises a cavity 111 and an aperture 112. The cavity 111 is a space located underneath the working space 163 of the automobile 161 within which the tailgate 162 is stored when in the retracted position 166. The aperture 112 is an opening formed at the rear of the automobile 161 through which the tailgate 162 retracts and extends. The aperture 112 is located at the rear of the automobile 161 below the working space 163 of the automobile 161 and above the bumper 167 of the automobile 161.

The mounting structure 102 comprises a mounting frame 120 and a lock hole 125. The mounting frame 120 is a rectangular structure that further comprises a first strut 121, a second strut 122, a third strut 123, and a fourth strut 124. The first strut 121 is a commercially available steel tube. The second strut 122 is a commercially available steel tube. The third strut 123 is a commercially available steel tube. The fourth strut 124 is a commercially available steel tube. The span of the first strut 121 is the same as the span of the third strut 123. The span of the second strut 122 is the same as the span of the fourth strut 124. The span of the first strut 121 is greater than the span of the second strut 122. As shown most clearly in FIG. 6, the first strut 121, the second strut 122, the third strut 123, and the fourth strut 124 are assembled into the rectangular structure of the mounting frame 120. The lock hole 125 is a hole formed in the center of the third strut 123. When properly installed in the automobile 161, the first strut 121 and the third strut 123 will be perpendicular to the normal direction of travel of automobile 161. When properly installed in the automobile 161, the second strut 122 and the fourth strut will be parallel to the normal direction of travel of automobile 161. The attachment of the mounting structure 102 to the track system 103 and the tailgate 162 is discussed elsewhere in this disclosure. The use of the lock hole 125 is discussed elsewhere in this disclosure.

Figure 8:
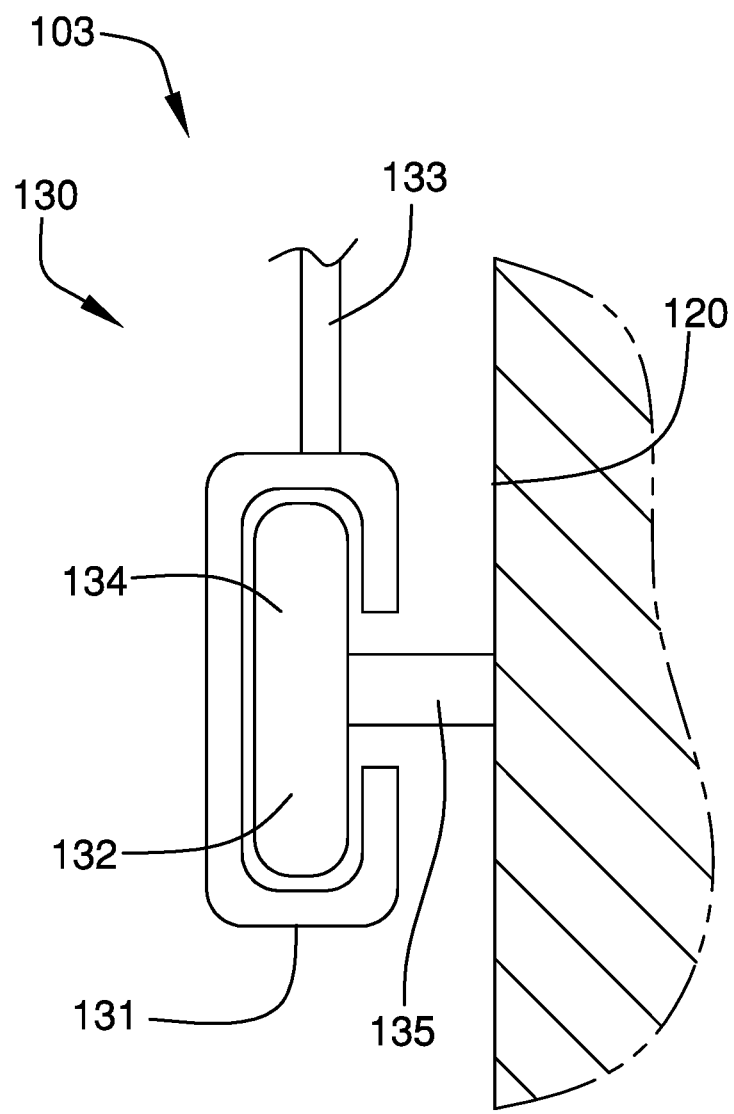
FIG. 8 is a detail view of an embodiment of the disclosure.

The track system 103 comprises a plurality of tee tracks 130. Each individual tee track selected from the plurality of tee tracks 130 is a tee track fastener that is used to attach the mounting frame 120 to the frame of the automobile 161. As shown most clearly in FIG. 8, each of the plurality of tee tracks 130 further comprises a channel 131, a plurality of rollers 132, and a plurality of brackets 133. The channel 131 is a bar that has formed within it a groove into which the rotating portion of each of the plurality of rollers 132 are inserted such that when a roller rotates the roller will travel along the length of the groove. The channel 131 is attached to the frame of the automobile 161 using the plurality of brackets 133. Each of the plurality of brackets 133 is a structure that is used to attach the channel 131 to the frame of the automobile 161. In the first potential embodiment of the disclosure, as shown in FIG. 8, each of the plurality of brackets 133 is a shaft that is used to secure the channel 131 to the automobile 161.

Each of the plurality of rollers 132 comprises a wheel 134 and an axle 135. The wheel 134 is a wheel 134 that is inserted into the channel 131 for the purpose of rolling through the channel 131 when the invention 100 extends or retracts. The axle 135 attaches to the wheel 134 such that the wheel 134 will rotate around the axle 135. As shown most clearly in FIG. 8, the axle 135 extends beyond the channel 131 in such a manner that the free end of the axle 135 associated with a roller selected from the plurality of rollers 132 attaches to the mounting frame 120. In the first potential embodiment of the disclosure the free end of each axle 135 associated with a roller selected from the plurality of rollers 132 is attached to a strut selected from the group consisting of the second strut 122 and the fourth strut 124.

Figure 6:
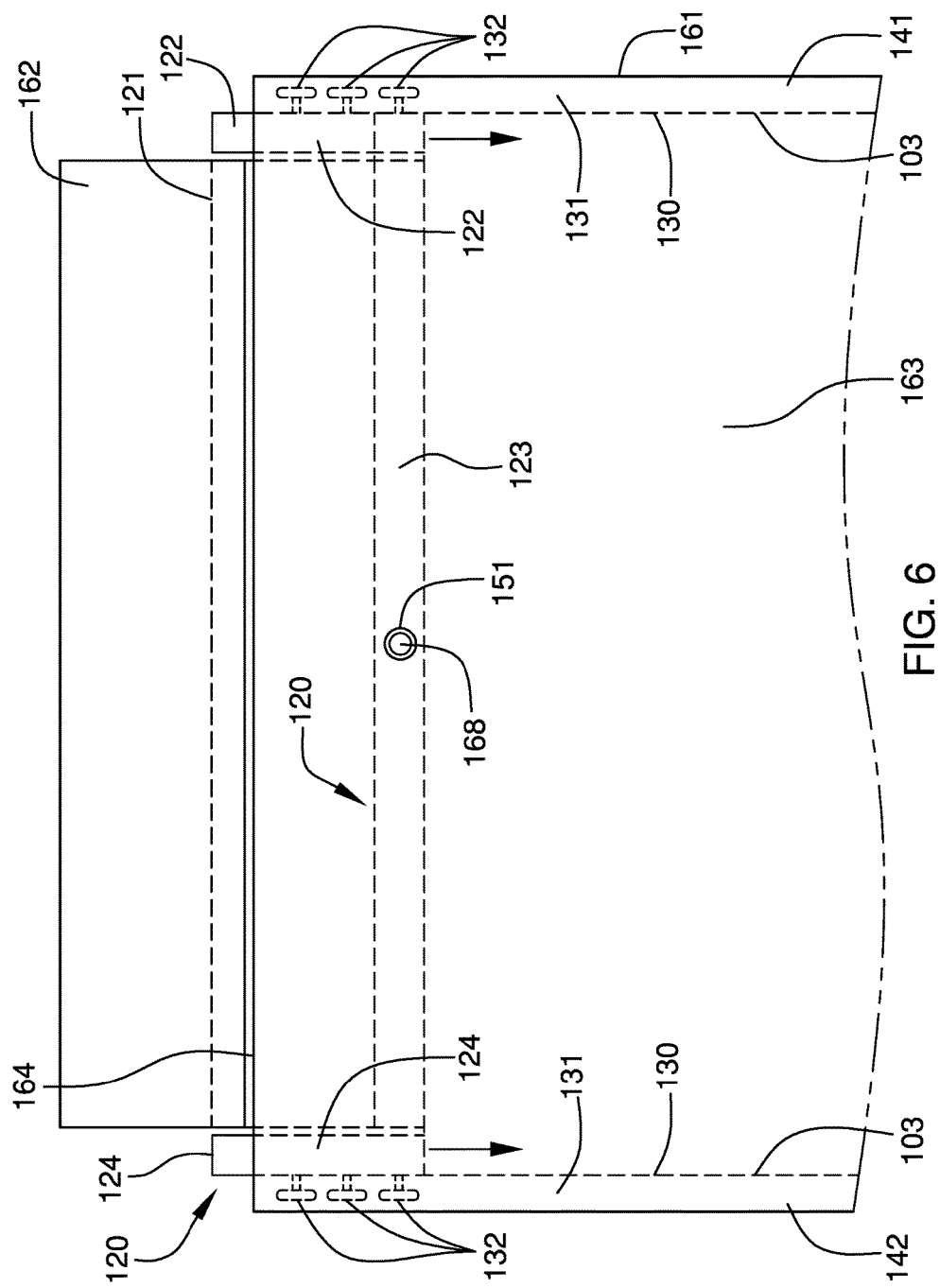
FIG. 6 is a top detail view of an embodiment of the disclosure.
Figure 7:
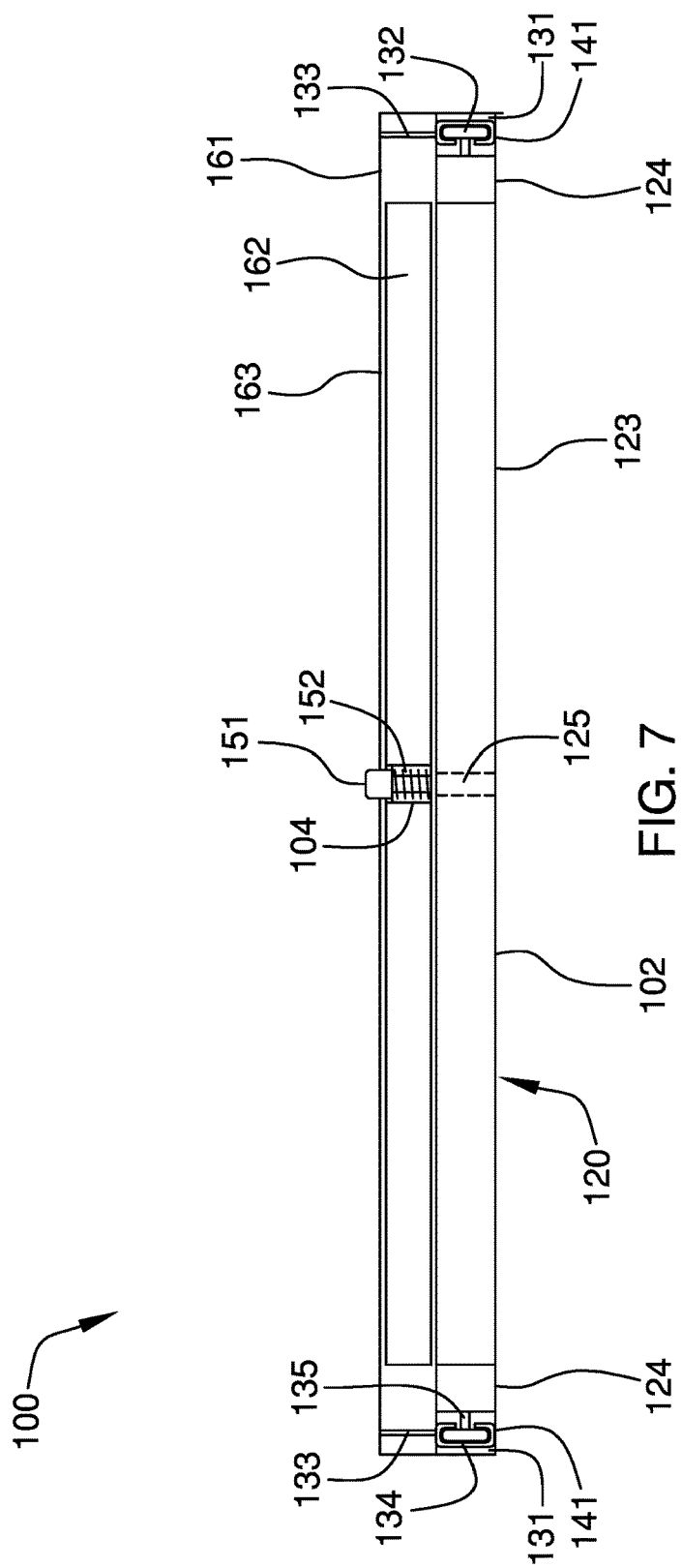
FIG. 7 is a front detail view of an embodiment of the disclosure.

As shown most clearly in FIGS. 6 and 7, the plurality of tee tracks 130 comprises a left track 141 and a right track 142. The left track 141 is mounted on the driver's side of the automobile 161 and the right track 142 is mounted on the right side of the automobile 161. The free end of the axle 135 associated with each of the plurality of rollers 132 of the left track 141 are attached to the second strut 122 of the mounting frame 120. The free end of the axle 135 associated with each of the plurality of rollers 132 of the right track 142 are attached to the fourth strut 124 of the mounting frame 120. The left track 141 and the right track 142 are mounted such that if the mounting frame 120 is properly attached to the plurality of tee tracks 130 then the first strut 121 of the mounting frame 120 extends beyond the aperture 112 in the extended position 165 and is completely contained within the cavity 111 in the retracted position 166.

The purpose of the locking system 104 is to lock the invention 100 in the extended position 165 when the invention 100 is not in use. The locking system 104 comprises a cotter pin 151 and a spring 152. The locking system 104 is adapted to work with a bed hole 168. The bed hole 168 is a hole that is formed through the interior surface of the working space 163 that is proximal to the storage slot 101. The cotter pin 151 is a commercially available metal shaft that is used as a detent to hold the mounting frame 120 in the extended position 165. The spring 152 is a commercially available compression spring. The cotter pin 151 is sized such that the cotter pin 151 will fit through the lock hole 125 and the bed hole 168. The compression spring 152 is sized such that the compression spring 152 will fit around the cotter pin 151. As shown most clearly in FIG. 6, the lock hole 125 and the bed hole 168 are positioned and aligned such that the cotter pin 151 can be simultaneously inserted through the lock hole 125 and the bed hole 168 when the invention 100 is in the extended position 165. As shown most clearly in FIGS. 3, 5, and 7, the spring 152 holds the cotter pin 151 in position when the locking system 104 is locking the invention 100 in the extended position 165. To release the locking mechanism, the cotter pin 151 is pulled through the bed hole 168 in a manner that compresses the compression spring 152.

Figure 2:
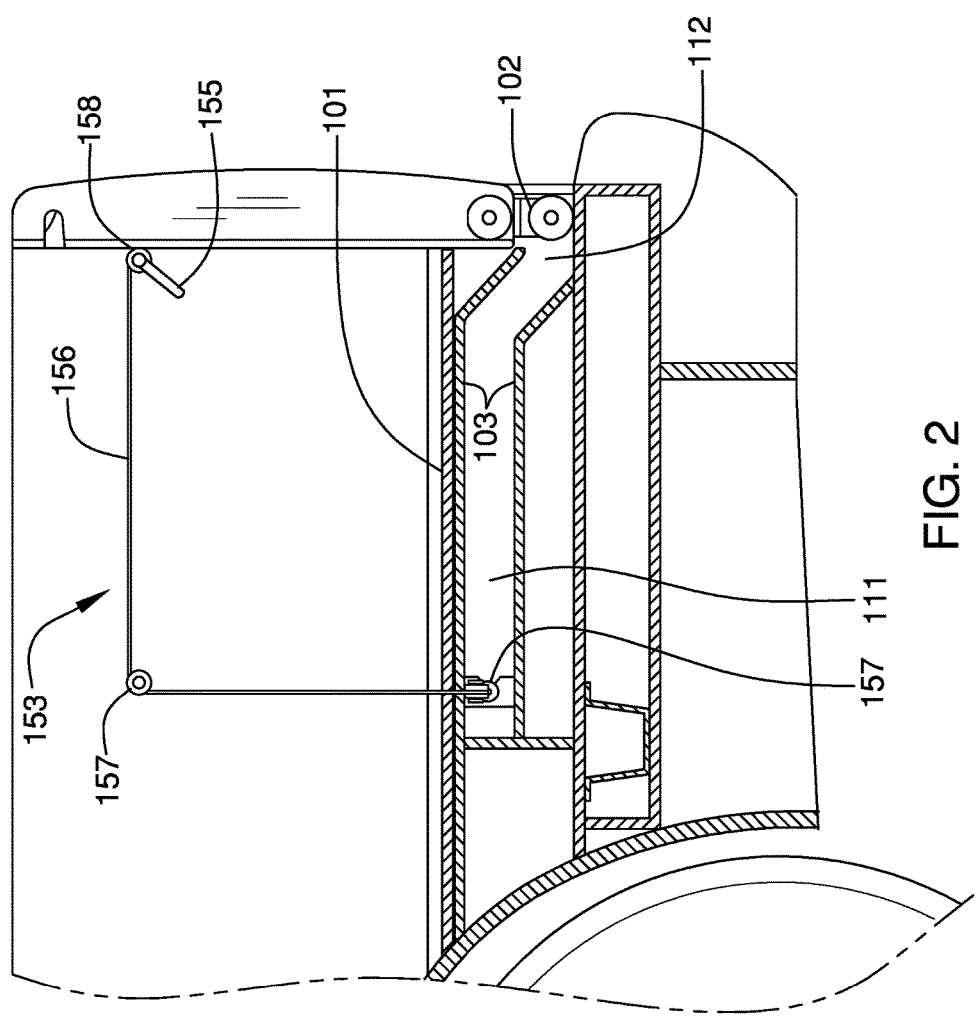
FIG. 2 is a perspective storage view of an embodiment of the disclosure.
Figure 3:
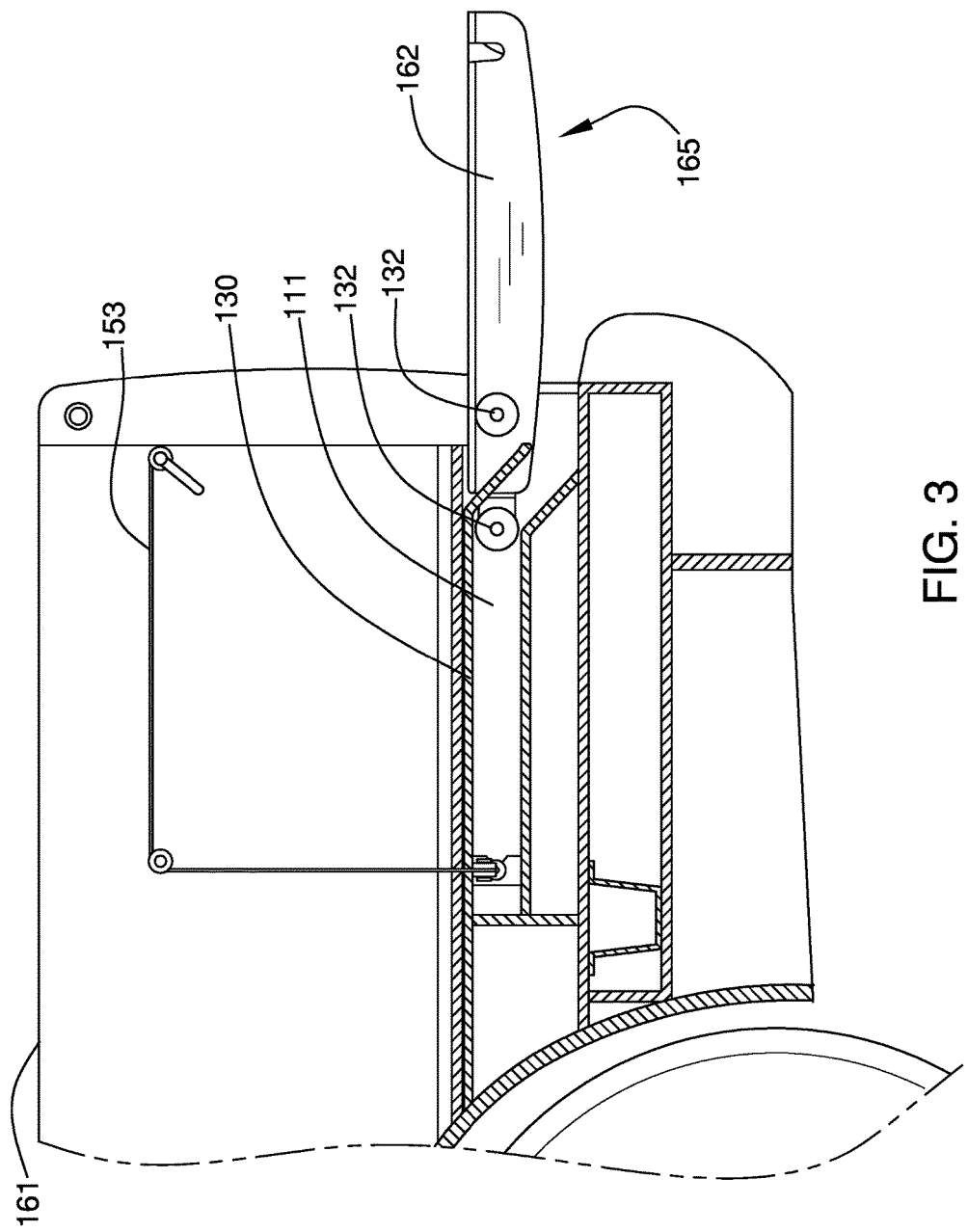
FIG. 3 is a side extended view of an embodiment of the disclosure.
Figure 4:
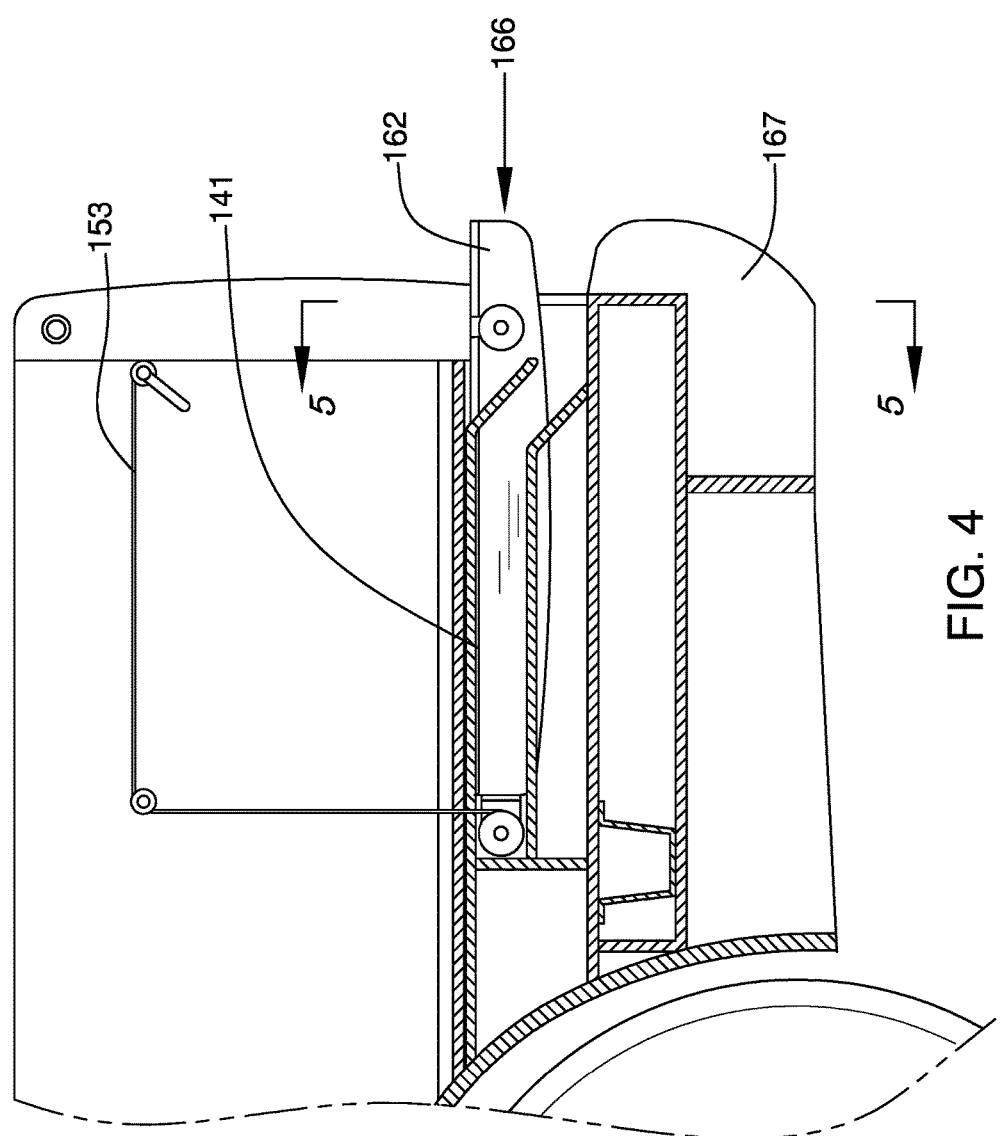
FIG. 4 is a side storage view of an embodiment of the disclosure.
Figure 5:
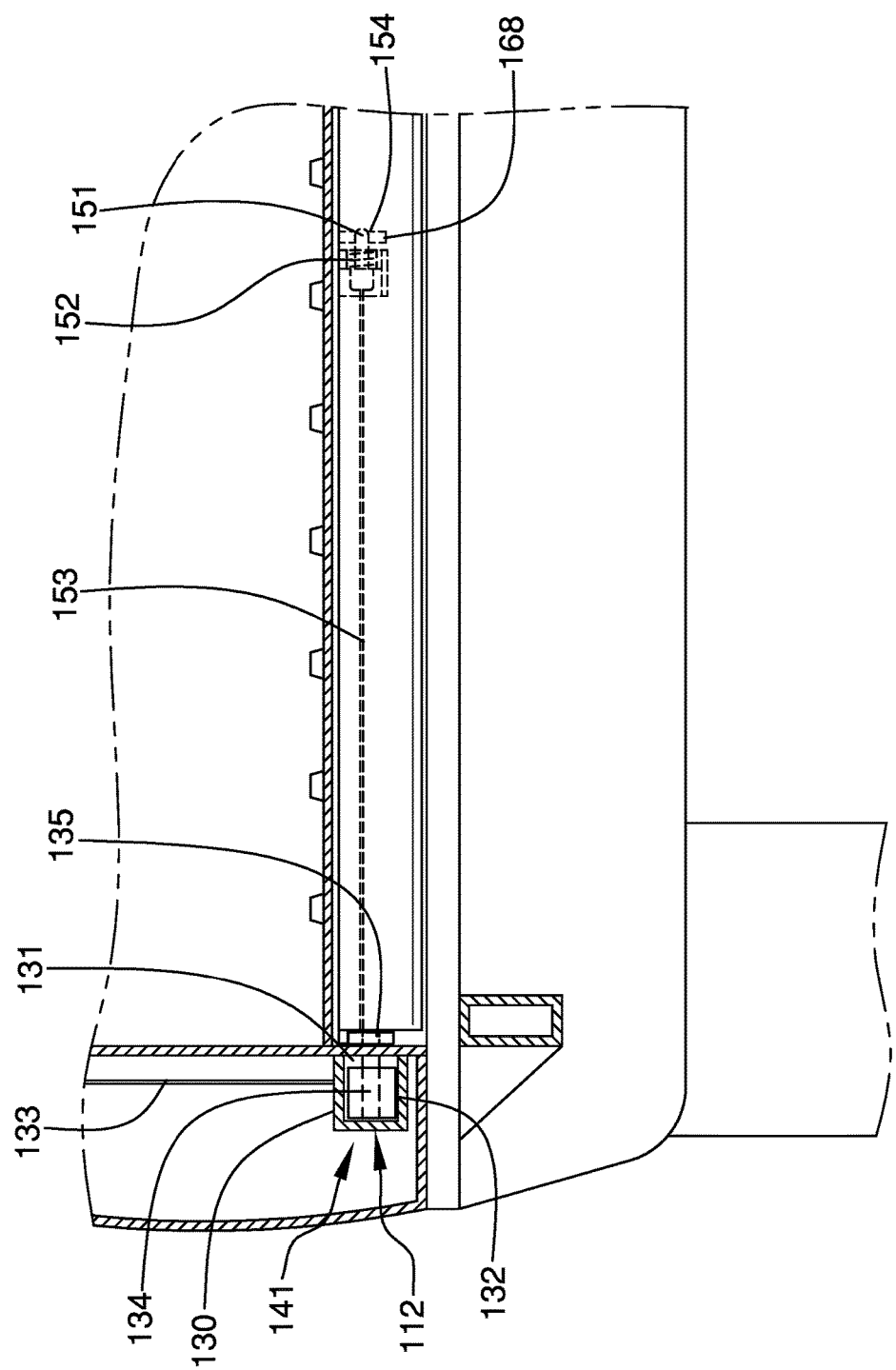
FIG. 5 is a rear view of an embodiment of the disclosure.

As shown most clearly in FIGS. 2 and 6, the tailgate 162 is directly attached to the first strut 121 using one or more hinges 164 in such a manner that the tailgate 162 can open and close normally. Methods to attach hinges to frames are well known and documented in the automotive arts.

To use the invention 100, the tailgate 162 of the automobile 161 is lowered normally. The cotter pin 151 is then pulled out of the lock hole 125 thus allowing the mounting structure 102 to retract into the cavity 111 through the aperture 112. The dimensions of the storage slot 101, the mounting structure 102, and the track system 103 are selected such that the mounting structure 102 and the tailgate 162 can be fully retracted into the storage slot 101 for storage. To extend the invention 100, the tailgate 162 and mounting structure 102 are rolled out of the storage slot 101 until the bed hole 168 is aligned with the lock hole 125. The invention 100 is then locked into position using the cotter pin 151 of the locking system 104.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Axle: As used in this disclosure, an axle is a cylindrical shaft that is inserted through the center of one or more wheels such that the center axis of the one or more wheels and the center axis of the axle are aligned.

Compression Spring: As used in this disclosure, a compression spring is a wire coil that resists forces attempting to compress the wire coil in the direction of the center axis of the wire coil. The compression spring will return to its original position when the compressive force is removed. In this disclosure, a compression spring has a cylindrical shape.

Cotter Pin: As used in this disclosure, a cotter pin is a metal shaft that is used to hold two mechanical components together.

Detent: As used in this disclosure, a detent is a device for attaching a first object to a second object in a manner such that: 1) the relative position of the first object relative to the second object is adjustable; and, 2) the first object is attached to the second object in a detachable manner.

Exterior: As used in this disclosure, the exterior is use as a relational term that implies that an object is not contained within the boundary of a structure or a space.

Interior: As used in this disclosure, the interior is use as a relational term that implies that an object is contained within the boundary of a structure or a space.

Pickup Truck: As used in this disclosure, a pickup truck is a vehicle having an enclosed cab and an open body comprising low sides and a tailgate that is powered by an internal combustion engine.

Spring: As used in this disclosure, a spring is a device that is used to store mechanical energy. This mechanical energy will often be stored by: 1) deforming an elastomeric material that is used to make the device; 2) the application of a torque to a rigid structure; or 3) a combination of the previous two items.

Tee Track Fastener: As used in this disclosure, a Tee track fastener is a fastening device that is used to attach a first object to a second object by sliding the first object on to the second object. The Tee track fastener further comprise a roller and a channel. The roller is attached to the first object and the channel is attached to the second object such that the first object is attached to the second object when the roller is inserted into the channel.

Tailgate: As used in this disclosure, a tailgate is a hinged door mounted on the rear of a pickup truck that can be lowered or removed in order to facilitate loading of the pickup truck.

Wheel: As used in this disclosure, a wheel is a circular object that revolves around an axle or an axis and is fixed below an object to enable it to move easily over the ground. For the purpose of this disclosure, it is assumed that a wheel can only revolve in a single direction comprising the forward and backward directions.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A moveable tailboard for motor vehicles comprising:
a storage slot, a mounting structure, a track system, and a locking system;
wherein the track system is contained within the storage slot;
wherein the mounting structure attaches the tailgate to the track system;
wherein the locking system locks the moveable tailboard for motor vehicles in position;
wherein the moveable tailboard for motor vehicles is adapted for use with an automobile;
wherein the automobile is further defined with a working space, a tailgate, and a bumper;
wherein the working space is an interior space within the automobile;
wherein the moveable tailboard for motor vehicles is an apparatus upon which the tailgate of the automobile is attached such that the tailgate can be opened and closed to provide access into the working space of the automobile;
wherein the moveable tailboard for motor vehicles is an apparatus upon which the tailgate of the automobile is attached such that the tailgate can be retracted to the storage slot;
wherein the storage slot is located underneath the working space;
wherein the moveable tailboard for motor vehicles is further defined with an extended position and a retracted position;
wherein the storage slot comprises a cavity and an aperture;
wherein the cavity is a space within which the tailgate is stored when in the retracted position;
wherein the aperture is an opening formed at the rear of the automobile through which the tailgate retracts and extends;
wherein the aperture is located at the rear of the automobile below the working space of the automobile;
wherein the aperture is located at the rear of the automobile above the bumper of the automobile;
wherein the mounting structure is located within the storage slot;
wherein the mounting structure comprises a mounting frame;
wherein the mounting frame is a rectangular structure that further comprises a first strut, a second strut, a third strut, and a fourth strut;
wherein the first strut is a steel tube;
wherein the second strut is a steel tube;
wherein the third strut is a steel tube;
wherein the fourth strut is a steel tube;
wherein the span of the first strut is the same as the span of the third strut;
wherein the span of the second strut is the same as the span of the fourth strut;
wherein the span of the first strut is greater than the span of the second strut;
wherein the first strut, the second strut, the third strut, and the fourth strut are assembled into the rectangular structure of the mounting frame.

2. The moveable tailboard for motor vehicles according to claim 1 wherein the mounting structure further comprises a lock hole;

wherein the lock hole is a hole formed in the center of the third strut.

3. The moveable tailboard for motor vehicles according to claim 2 wherein the first strut and the third strut are perpendicular to the normal direction of travel of automobile;

wherein the second strut and the fourth strut are parallel to the normal direction of travel of automobile.

4. The moveable tailboard for motor vehicles according to claim 3 the track system attaches the mounting frame to the frame of the automobile.

5. The moveable tailboard for motor vehicles according to claim 4 wherein the track system comprises a plurality of tee tracks;

wherein the plurality of tee tracks comprises a left track and a right track;

wherein the left track is mounted on the driver's side of the automobile;

wherein the right track is mounted on the right side of the automobile.

6. The moveable tailboard for motor vehicles according to claim 5 wherein each of the plurality of tee tracks further comprises a channel, a plurality of rollers, and a plurality of brackets;

wherein the plurality of brackets is a structure that attaches the channel to the automobile;

wherein the plurality of rollers attach the mounting frame to the channel.

7. The moveable tailboard for motor vehicles according to claim 6 wherein each of the plurality of rollers comprises a wheel and an axle;

wherein the wheel is a wheel that is inserted into the channel for the purpose of rolling through the channel when the moveable tailboard for motor vehicles extends or retracts;

wherein the axle attaches to the wheel such that the wheel will rotate around the axle.

8. The moveable tailboard for motor vehicles according to claim 7 wherein the channel is a bar that has formed within it a groove;

wherein each of the plurality of rollers are inserted into the groove such that when a roller rotates the roller will travel along the length of the groove.

9. The moveable tailboard for motor vehicles according to claim 8 wherein an end of the axle associated with a roller selected from the plurality of rollers extends beyond the channel in such a manner that the free end of the axle attaches to the mounting frame.

10. The moveable tailboard for motor vehicles according to claim 9 wherein the end of the axle associated with each of the plurality of rollers of the left track are attached to the second strut of the mounting frame.

11. The moveable tailboard for motor vehicles according to claim 10 wherein the free end of the axle associated with each of the plurality of rollers of the right track are attached to the fourth strut of the mounting frame.

12. The moveable tailboard for motor vehicles according to claim 11 wherein the left track and the right track are mounted such that first strut is completely contained within the cavity in the retracted position.

13. The moveable tailboard for motor vehicles according to claim 12 wherein the left track and the right track are mounted such that first strut of the mounting frame extends beyond the aperture in the extended position.

14. The moveable tailboard for motor vehicles according to claim 13 wherein the locking system locks the moveable tailboard for motor vehicles in the extended position.

15. The moveable tailboard for motor vehicles according to claim 14 wherein the locking system comprises a cotter pin and a spring;

wherein the locking system is adapted to work with a bed hole;

wherein the bed hole is a hole that is formed through an interior surface of the working space;

wherein the cotter pin is a metal shaft;

wherein the spring is a compression spring;

wherein the cotter pin is sized such that the cotter pin will fit through the lock hole and the bed hole;

wherein the compression spring is sized such that the compression spring will fit around the cotter pin.

16. The moveable tailboard for motor vehicles according to claim 15 wherein the lock hole and the bed hole are positioned and aligned such that the cotter pin can be simultaneously inserted through the lock hole and the bed hole when the moveable tailboard for motor vehicles is in the extended position;

wherein to release the locking mechanism the cotter pin is pulled through the bed hole in a manner that compresses the compression spring.

17. The moveable tailboard for motor vehicles according to claim 16 wherein the tailgate attaches to the first strut.

18. The moveable tailboard for motor vehicles according to claim 17 wherein each of the plurality of brackets is a shaft that is used to secure the channel to the automobile.

* * * * *